United States Patent
Sychra et al.

(10) Patent No.: US 7,307,396 B2
(45) Date of Patent: Dec. 11, 2007

(54) OVERLOAD PROTECTION SYSTEM FOR AN ELECTRICAL DEVICE

(75) Inventors: Robert R. Sychra, Washington, IL (US); Daniel F. Stanek, Chillicothe, IL (US); William J. Tate, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 328 days.

(21) Appl. No.: 11/009,019

(22) Filed: Dec. 13, 2004

(65) Prior Publication Data

US 2006/0126250 A1    Jun. 15, 2006

(51) Int. Cl.
*H02H 7/08* (2006.01)
(52) U.S. Cl. .................. 318/471; 318/472; 318/473; 361/23; 361/24; 361/25
(58) Field of Classification Search ............... 318/434, 318/432, 471, 472, 473; 361/24, 23, 25
See application file for complete search history.

(56) References Cited

U.S. PATENT DOCUMENTS

| | | | | |
|---|---|---|---|---|
| 4,035,692 A | * | 7/1977 | Luy et al. | 361/103 |
| 4,624,343 A | * | 11/1986 | Tanahashi et al. | 187/296 |
| 4,744,511 A | * | 5/1988 | Kakehi et al. | 236/13 |
| 5,373,205 A | * | 12/1994 | Busick et al. | 327/378 |
| 5,510,687 A | | 4/1996 | Ursworth et al. | |
| 6,369,973 B1 | * | 4/2002 | Mushika et al. | 360/78.07 |
| 6,424,266 B1 | * | 7/2002 | Weekes et al. | 340/588 |
| 6,434,505 B1 | | 8/2002 | Koepke et al. | |
| 6,522,094 B1 | * | 2/2003 | Griesemer et al. | 318/430 |
| 6,829,556 B2 | * | 12/2004 | Kumar | 702/132 |
| 6,876,606 B2 | * | 4/2005 | Kajino et al. | 369/44.27 |

FOREIGN PATENT DOCUMENTS

| | | |
|---|---|---|
| DE | 101 06 944 | 9/2002 |
| FR | 2841398 | * 12/2003 |
| GB | 1508505 | 4/1978 |

* cited by examiner

*Primary Examiner*—Rita Leykin
(74) *Attorney, Agent, or Firm*—Finnegan, Henderson, Farabow, Garrett & Dunner

(57) ABSTRACT

A protection system for an electrical device may include at least one temperature sensitive element located in a region adjacent to a component of the electrical device and configured to provide an output related to an actual temperature in the region. The system may also include a controller configured to determine the actual temperature in the region based on the output of the at least one temperature sensitive element and to determine a predicted temperature of the component based on the actual temperature in the region and on a predetermined heat dissipation characteristic of the electrical device.

26 Claims, 4 Drawing Sheets

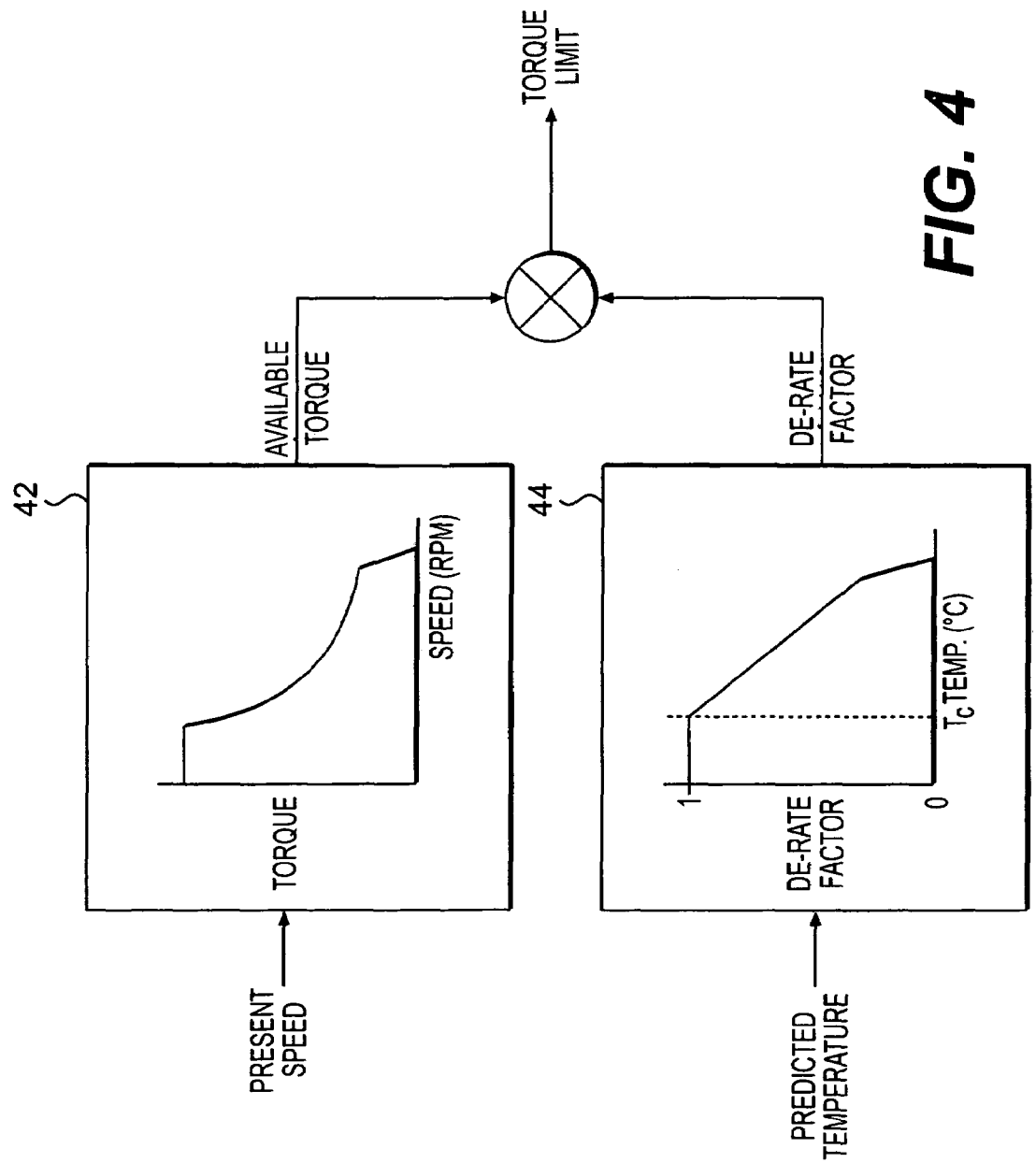

OVERLOAD PROTECTION SYSTEM FOR AN ELECTRICAL DEVICE

TECHNICAL FIELD

The present disclosure relates to a system for protecting against an overheating condition in an electrical device, and more particularly, to a system for predicting the temperature of windings in an electric motor associated with a work machine and controlling the operation of the electric motor based on the predicted temperature.

BACKGROUND

Work machines such as, for example, wheel loaders, track type tractors, and other types of machinery are used for a variety of tasks. These work machines may include a power source, such as a diesel engine, a gasoline engine, a natural gas engine, or any other type of power source, that provides the power required to complete these tasks. In certain power systems, the power source may be coupled to a generator to produce an electrical power output supplied to one or more electric motors. The motors may be connected to ground engaging traction devices to propel the work machine.

The electric motors coupled to the traction devices may include, for example, AC induction motors. While these types of motors may be capable of operating for brief periods at peak torque levels greater than their continuous rating, the high currents associated with these peak torque levels can lead to damage of various electric motor components. For example, a sustained, high-current condition (i.e., an overload condition) may result in elevated temperatures in the conductive windings of the motor stator. These elevated temperatures can damage the insulation of the windings, which can lead to eventual or even immediate conductor failure.

The electric motors may be protected from potential damage by ensuring that the temperature of the conductive windings of the stator does not exceed a desired level. Monitoring this temperature, however, can be challenging. Particularly, temperature sensing devices, even if placed directly adjacent to the windings, can provide inaccurate measurements of the winding temperature. Due to the large mass of metal that may be used to form the motor stator in, especially, heavy duty electric motors for high power traction applications, the motors may have large thermal time constants. Thus, in response to high currents in the stator conductors, the temperature of the conductors can significantly exceed a specified rating before the surrounding areas, including the temperature sensors, exhibit even a modest temperature change. Thus, in order to protect an electric motor from damage caused by overload conditions, a system for accurately determining the temperature of the stator windings of an electric motor may be required.

At least one system has been developed for protecting against an overload in an electric motor. For example, U.S. Pat. No. 5,510,687 ("the '687 patent), issued to Unsworth et al. on Apr. 23, 1996, describes a system for detecting an overload condition in an electric motor by estimating the temperature of the motor. Particularly, the system of the '687 patent introduces a DC voltage component onto a stator winding of the electric motor. The system includes circuitry to determine the DC voltage drop across the winding. The system also includes a Hall effect device for sensing the current in the winding attributed to the DC voltage. Based on the sensed voltage and current values, the resistance of the winding may be calculated using Ohm's law. The temperature of the winding may be predicted by comparing the calculated resistance value to a calibrated resistance value determined for a known temperature. If the predicted temperature exceeds a predetermined threshold value, the electric motor is shut down.

While the system of the '687 patent may be effective for avoiding overload conditions in certain situations, the system of the '687 patent includes several disadvantages. For example, the system includes complex circuitry for measuring the DC voltage and current signals in the motor winding. This circuitry can add expense to the motor and may adversely affect its reliability. Further, the system must actively compensate for the effects on motor operation caused by the introduced DC voltage component. Because each motor may exhibit unique resistance characteristics, each motor may require calibration prior to operation to determine a baseline resistance value at a known temperature. This can result in added manufacturing expense. Also, upon detection of an overload condition, the system of the '687 patent fully shuts down the motor rather than allowing the motor to continue operating with a reduced output level.

The present disclosure improves upon the prior art systems for protecting against an overload condition in an electric motor.

SUMMARY OF THE INVENTION

One disclosed embodiment includes a protection system for an electrical device. The system may include at least one temperature sensitive element located in a region adjacent to a component of the electrical device and configured to provide an output related to an actual temperature in the region. The system may also include a controller configured to determine the actual temperature in the region based on the output of the at least one temperature sensitive element and to determine a predicted temperature of the component based on the actual temperature in the region and on a predetermined heat dissipation characteristic of the electrical device.

Another disclosed embodiment includes a method of protecting against an overload condition of an electric motor. The method may include determining an actual temperature of a region adjacent to a component of the electric motor and calculating a predicted temperature of the component based on the actual temperature and at least one heat dissipation characteristic of the electric motor. The method may also include adjusting at least one operational parameter of the electric motor if the predicted temperature exceeds a predetermined value.

Another disclosed embodiment includes a work machine that may include a power source configured to provide a power output and a generator operatively coupled to the power source for converting at least a portion of the power output to electrical energy. The machine may include at least one electric motor operatively coupled to the generator and configured to receive at least a portion of the electrical energy, at least one traction device operatively coupled to the at least one motor, and a protection system for the at least one electric motor. The protection system may include at least one temperature sensitive element located in a region adjacent to a component of the electric motor and configured to provide an output related to an actual temperature in the region. A controller may be configured to determine the actual temperature in the region based on the output of the at least one temperature sensitive element and to determine a predicted temperature of the component based on the temperature in the region and on a predetermined heat dissipation characteristic of the electric motor.

BRIEF DESCRIPTION OF THE DRAWINGS

FIG. 4 provides an information flow diagram for an electric motor protection system, according to an exemplary disclosed embodiment.

DETAILED DESCRIPTION

Figure 1:
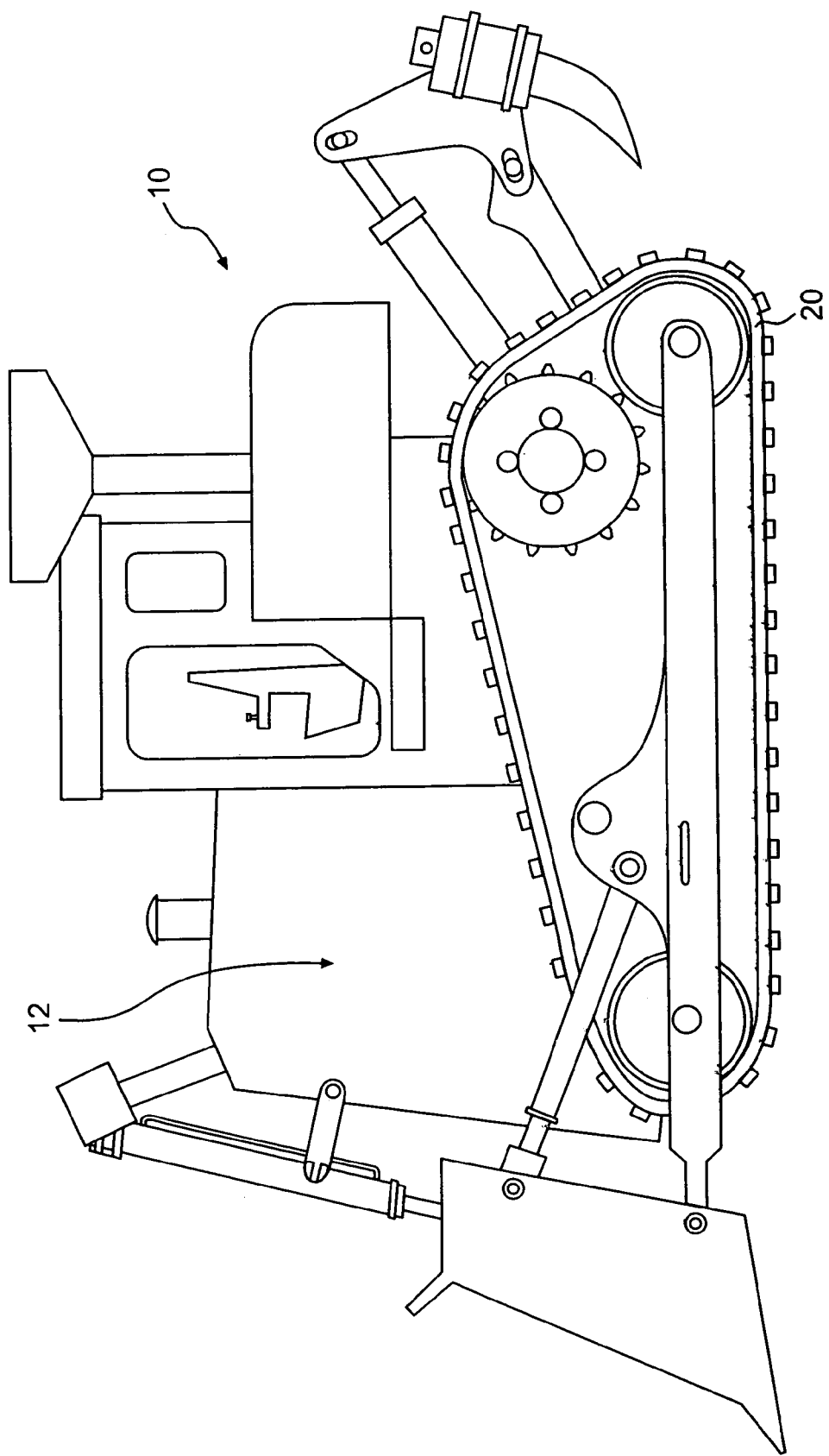
FIG. 1 provides a diagrammatic perspective view of a work machine, according to an exemplary disclosed embodiment.

FIG. 1 provides a diagrammatic perspective view of a work machine 10 according to an exemplary disclosed embodiment. While work machine 10 is illustrated as a track type tractor, work machine 10 may include any type of work machine that includes one or more electric motors. For example, work machine 10 may include on-highway vehicles, off-highway vehicles, wheel loaders, excavators, skid steers, and other types of machinery.

Work machine 10 may include a power source 12 configured to provide a power output for powering various operations of work machine 10. Power source 12 may include an internal combustion engine that operates using diesel fuel, gasoline, natural gas, or other types of fuel.

Figure 2:
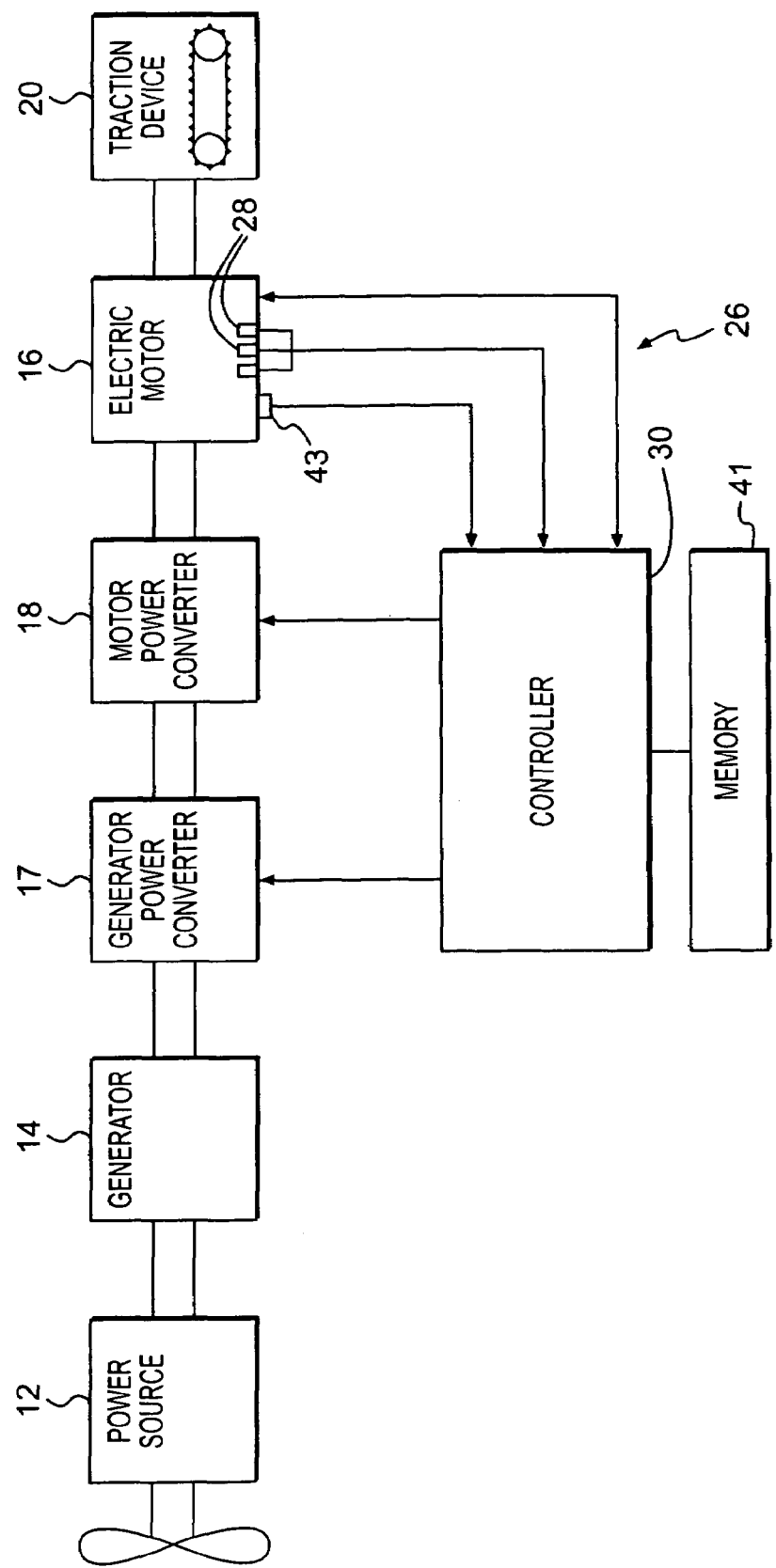
FIG. 2 provides a schematic, block diagram representation of components of a work machine 10, according to an exemplary disclosed embodiment.

Power source 12 may be operatively coupled to a generator 14, as shown in FIG. 2. Generator 14 may include any type of device that may be configured for converting at least a portion of the power output supplied by power source 12 into electrical energy. For example, in response to the mechanical power output of power source 12, generator 14 may produce electrical energy that may be stored or used to drive one or more electrically driven components.

In one embodiment, generator 14 may be operatively coupled to an electric motor 16, and electrical energy produced by generator 14 may be used to drive electric motor 16. For example, generator 16 may be configured to provide a three-phase output of a desired voltage level (e.g., 480V or any other suitable level) and supply this output to a generator power converter 17. Generator power converter 17 may covert the three-phase voltage to a DC voltage of another desired level (e.g., 615V or any other suitable level). A motor power converter 18 may be configured to receive the voltage supplied by generator power converter 17 and to provide electric motor 16 with a variable voltage, three-phase, AC voltage that may be used to drive electric motor 16.

While only one electric motor 16 is illustrated in FIG. 2, work machine 10 may include a plurality of electric motors powered by generator 14. Further, electric motor 16 may be an AC induction motor configured for traction applications. Electric motor 16, however, may be configured as an electric motor of any type and size/capacity for meeting the needs of a particular application.

Work machine 10 may also include a traction device 20 operatively coupled to electric motor 16. Traction device 20 may be a tracked device, as illustrated in FIGS. 1 and 2. Alternatively, traction device 20 may include wheels or any other type of ground-engaging device. Traction device 20 may be operatively coupled to electric motor 16 through one or more devices. For example, various power transfer devices (not shown) and differential steering units (not shown) may be included between electric motor 16 and traction device 20 for transferring power from electric motor 16 to traction device 20.

Work machine 10 may include an electric motor protection system 26 associated with electric motor 16. Protection system 26 may be configured to minimize or prevent the risk of damage to electric motor 16 and may include one or more temperature sensitive elements 28. Protection system 26 may also include a controller 30 operatively coupled to electric motor 16 and to the one or more temperature sensitive elements 28.

Figure 3:
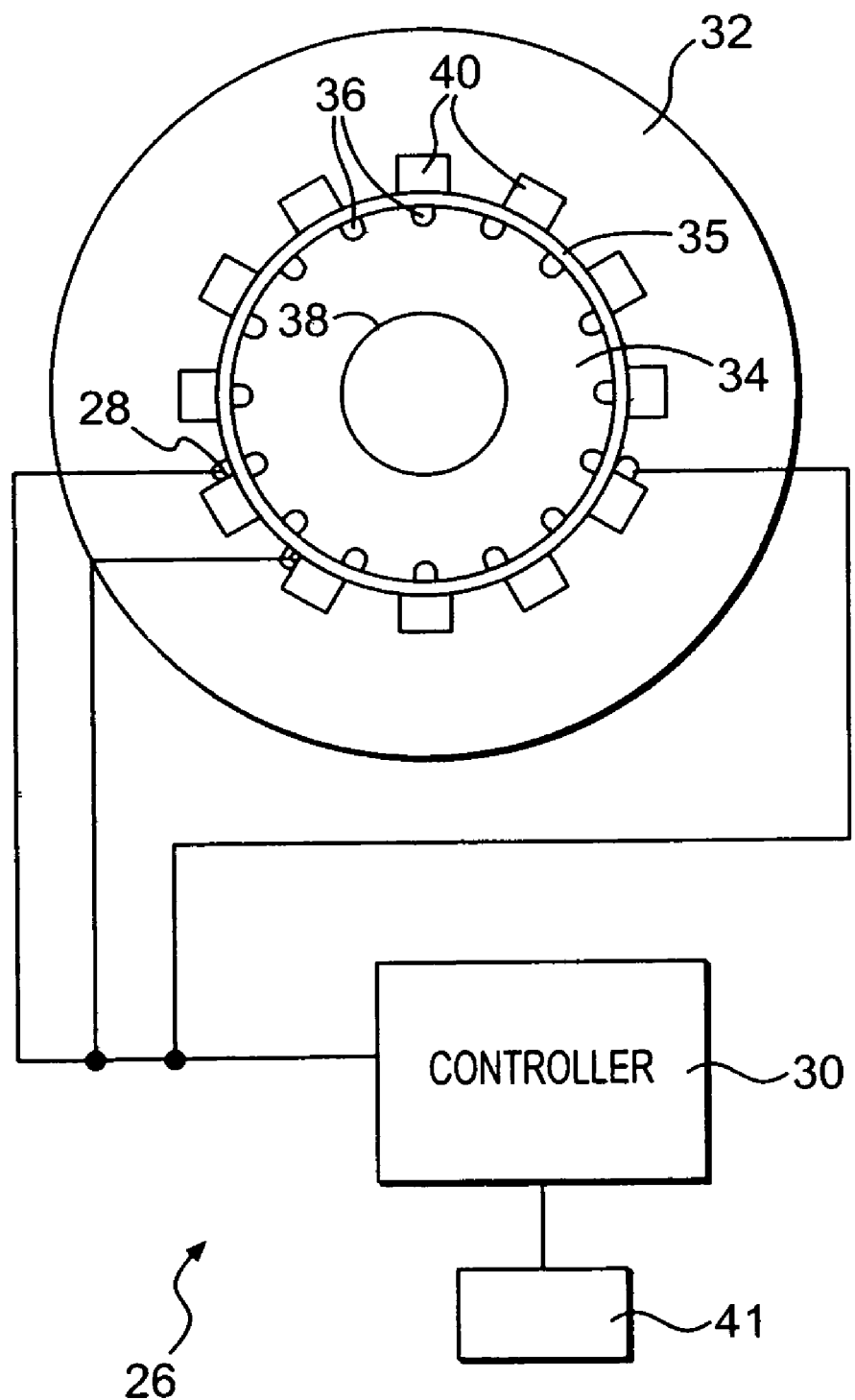
FIG. 3 provides a diagrammatic illustration of an electric motor protection system, according to an exemplary disclosed embodiment.

FIG. 3 provides a diagrammatic illustration of electric motor protection system 26 and electric motor 16. As an induction motor, electric motor 16 may include two main components: a stator 32 and a rotor 34 separated from one another by an air gap 35. Rotor 34 may be constructed of a number of conducting bars 36 in electrical contact with one another and running parallel to a shaft 38 of electric motor 16. Stator 32 may include a pattern of stator conductors 40 arranged in windings. As alternating current is passed through stator conductors 40, a moving magnetic field is formed near stator 32. This magnetic field causes electric currents in the elements of rotor 34, which causes rotor 34 to generate a magnetic field of its own. The interaction of these magnetic fields can produce a torque on rotor 34 and, therefore, on shaft 38, which may be coupled to rotor 34.

To produce the high torque levels needed for traction applications, large motor currents may be passed through stator conductors 40. If left unmonitored, these motor currents can quickly produce sufficient levels of heat to damage the stator insulation (not shown) associated with stator conductors 40. Such a condition may correspond to an overload condition of electric motor 16 and can lead to eventual or immediate failure of electric motor 16.

Controller 30 and temperature sensitive elements 28 may be configured to protect against overload conditions in electric motor 16. As shown in FIG. 3, electric motor protection system 26 may include a plurality of temperature sensitive elements 28. While the exemplary embodiment illustrated in FIG. 3 includes an array of three temperature sensitive elements 28, protection system 26 may include any number of temperature sensitive elements greater than or less than three. In one embodiment, protection system 26 may operate using only one temperature sensitive element 28.

Temperature sensitive elements 28 may be disposed in electric motor 16 in regions adjacent to one or more of stator conductors 40. For purposes of the present disclosure, a region adjacent to stator conductor 40 includes any location in contact with or displaced from stator conductor 40 where temperature sensitive element 28 will provide at least some response to heat generated by stator conductor 40. Further, temperature sensitive elements 28 may include any types of devices that can provide an output related to the temperature of an environment in which they are located. In one embodiment, one or more of temperature sensitive elements 28 may include a platinum resistive temperature device (RTD). Such an RTD may include a resistance that changes with temperature according to a known relationship (e.g., a linear relationship in a particular temperature range of interest).

Controller 30 may include various components for running software applications. For example, controller 30 may include a central processing unit (CPU), a random access memory (RAM), input/output (I/O) elements, etc. Controller 30 may constitute a unit dedicated to electric motor protection system 26. Alternatively, controller 30 may coincide with an electronic control unit (ECU) of work machine 10. Further, controller 30 may include various modules, whether integrated or stand-alone, for controlling generator power converter 17 and motor power converter 18. For storage and retrieval of information and data, controller 30 may be associated with a memory unit 41.

Controller 30 may be configured to monitor the output of temperature sensitive elements 28 and determine temperature values associated with any or all of temperature sensitive elements 28. For purposes of the present disclosure, an output may include both actively supplied information (e.g., an information carrying signal) and passively supplied information (e.g., a measurable or detectable characteristic, such as the resistance of an RTD). In the RTD embodiment, for example, controller 30 may be configured to supply a voltage or current signal to temperature sensitive elements 28 and determine resistance values associated with one or more of temperature sensitive elements 28. Based on the measured resistance values, controller 30 may determine the temperatures of the regions in which temperature sensitive elements 28 reside.

Because of the significant thermal mass that may be included in stator 32 and other components of electric motor 16, the temperature values determined based on the outputs of temperature sensitive elements 28 (i.e., the actual temperature values of the regions in which temperature sensitive elements 28 are located) may be different from the actual temperature of stator conductors 40. Thus, controller 30 may be configured to determine a predicted temperature associated with stator conductors 40. This predicted temperature may be determined based on one or more of the temperature values provided by temperature sensitive elements 28, predetermined heat dissipation characteristics of electric motor 16, the magnitude of currents flowing in or that have flowed in stator conductors 40, and any other temperature-affecting parameters.

Controller 30 may be configured to determine the predicted temperature of stator conductors 40 by summing together at least one actual temperature provided by temperature sensitive elements 28 and at least one term that depends on the current in stator conductors 40. In certain embodiments, the magnitude of the current in stator conductors 40 can be a measured quantity. Alternatively, and preferably, the magnitude of the current in stator conductors 40 may be directly controlled by a motor power converter function or CPU portion of controller 30, and, therefore, may be a known quantity.

In one embodiment, controller 30 may be configured to determine the predicted temperature of stator conductors 40 according to the equation:

$$T_p(n) = T_a(n) + \alpha I^2(n-1) + \beta \sum_{x=0}^{n-2} \alpha I^2(x) \quad (1)$$

where $T_p$ represents the predicted temperature of the conductor, n represents a sample time, $T_a$ represents the actual temperature of the region, $\alpha$ represents a scale factor and a dissipation coefficient for the electric motor, I represents a magnitude of a current flowing in the conductor, and $\beta$ represents a dispersion constant for the electric motor. This equation estimates the actual temperature of stator conductors 40 based on the present temperature readings provided by temperature sensitive elements 28 and the recent power absorption history of stator conductors 40.

Samples of the temperature information provided by temperature sensitive elements 28 may be taken at a plurality of sample times, n, spaced apart by regular sample time intervals. These sample time intervals may be set as any appropriate length of time consistent with the requirements of a particular application. In one embodiment, these sample measurements and the calculation of the predicted temperature of stator conductors 40 may be performed at regular 10 millisecond intervals.

The first term on the right side of equation (1) represents the temperature provided by one of temperature sensitive elements 28 at a current sample time n. This temperature value, as described above, may correspond to an actual temperature value in a region adjacent to stator conductors 40 at sample time n.

The second term of equation (1) represents a contribution to the temperature of stator conductors 40 caused by the current flowing in stator conductors 40 at a sample time n−1 (i.e., the sample time just prior to the current sample time n). The current, I, in stator conductors 40 is squared in the second term of the equation to reflect that this term is related to power dissipation. The coefficient $\alpha$ includes both a scale factor and a dissipation coefficient related to the dissipation characteristics of electric motor 16.

The third term of equation (1) represents a discrete integrator that approximates the thermal dispersion properties of electric motor 16. A running sum of thermal power dissipation samples, $\alpha I^2$, is multiplied by a dispersion constant, $\beta$. The sample time zero (i.e., x=0) of the integrator represents an initial time when the temperature prediction algorithm begins operation. The running sum of the thermal power dissipation samples, therefore, includes all samples up through a sample time n−2 (i.e., two sample times prior to the current sample time). Coefficient $\beta$, i.e., the dispersion constant, has a value between 0 and 1 and is dependent on the sample time frequency of controller 30.

The coefficients $\alpha$ and $\beta$ may be experimentally determined for electric motor 16 or, alternatively, for a class of electric motors that includes electric motor 16. For example, the values of these coefficients can be chosen such that predicted temperature provided by equation (1) most closely matches the actual temperature conditions determined in, for example, a test-lab environment. As one example of coefficient values that may be determined in this manner, the coefficient $\alpha$ may have a value of 0.000001, and the coefficient $\beta$ may have a value of 0.98.

As noted above, temperature sensitive elements 28 may include an array of elements each providing temperature information related to different regions of electric motor 16. Equation (1) may be used to predict a temperature of stator conductors 40 based on any, some, or all of temperature sensitive elements 28. It may be possible, therefore, to generate a plurality of different predicted temperature values of stator conductors 40. These different predicted temperature values may represent hot spots and cool spots in stator conductors 40 or may reflect varying degrees of sensitivity of temperature sensitive elements 28. If desired, a single predicted temperature of stator conductors 40 may be determined by either selecting a single predicted temperature value (e.g., the highest calculated temperature) from among the plurality of calculated values, by averaging the calculated values, or according to any other desired operation.

Determining a predicted temperature of stator conductors 40 can indicate when an overload condition exists in electric motor 16. Additionally, the predicted temperature value of stator conductors 40 may be used to actively avoid such an overload condition.

FIG. 4, illustrates an information flow diagram representative of an exemplary process that electric motor protection system 26 may employ to minimize or prevent the risk of an overload condition. As shown in FIG. 4, a torque vs. speed map 42 represents a predetermined torque rating limit for electric motor 16. Work machine 10 may include a motor speed sensor 43 (e.g., a dual Hall effect sensor or any other appropriate type of sensor), as shown in FIG. 2, to provide a present operating speed value for electric motor 16. Using this present speed value and torque vs. speed map 42, controller 30 may determine a maximum available torque value corresponding to the present speed of electric motor 16. This available torque value can be multiplied by a de-rate factor, as shown in FIG. 4, to determine a torque limit that can be applied to electric motor 16.

Controller 30 may determine the de-rate factor by comparing the predicted temperature value of stator conductors 40 to a predetermined de-rate factor vs. temperature map 44. As illustrated, the de-rate factor is a value that can vary between zero and one. At low conductor temperatures, the de-rate factor is one, which translates into a torque limit equal to the maximum available torque limit prescribed by torque vs. speed map 42 (i.e., 100% of the maximum available torque limit). As the predicted temperature of stator conductors 40 rises, however, the de-rate factor may have a value less than one. For a de-rate factor of 0.5, for example, the torque limit applied to electric motor 16 would be 50% of the maximum available torque limit prescribed by torque vs. speed map 42. By de-rating the maximum available torque according to the predicted temperature of stator conductors 40, the risk of an overload condition in electric motor 16 can be reduced.

Controller 30 may be configured to apply a torque limit to electric motor 16 only upon reaching a certain predetermined threshold temperature. This threshold temperature may correspond to a temperature $T_c$, as shown on de-rate factor vs. temperature map 44, that corresponds to a temperature where the de-rate factor becomes less than one. Alternatively or additionally, controller 30 may be configured to control the operation of electric motor 16 based on any number of other temperature threshold values. For example, a critical temperature threshold value may be set such that upon reaching the critical temperature, electric motor 16 may be shut down.

INDUSTRIAL APPLICABILITY

The disclosed protection system may be used to protect any component of any type of electrical device that can be damaged by heat. In one exemplary disclosed embodiment, the component may correspond to a stator conductor 40 of electric motor 16.

The presently disclosed protection system has several advantages. For example, while multiple temperature sensitive devices 28 may be included, protection system 26 can be configured to predict the temperature of stator conductors 40 using only a single temperature sensitive device 28. With fewer sensor devices, there may be significant savings in manufacturing and assembly costs. Further, with fewer sensors, reliability of protection system 26 may be improved over systems having a complex arrangements of many sensors.

There may also be manufacturing cost advantages derived from the ability to place temperature sensitive elements 28 in regions adjacent to stator conductors 40. For example, because of the temperature predictive capabilities of protection system 26, temperature sensors 28 need not be located directly within or even in contact with stator conductors 40. The flexibility of placement of the elements can reduce the design complexity and processing costs associated with design and assembly of electric motor 16.

Protection system 26 can also improve the operating efficiency of work machine 10. For example, rather than waiting for an overload condition to occur and then simply shutting down electric motor 16, which could effectively shut down work machine 10, protection system 26 can actively control the operation of electric motor 16 to reduce the risk of an overload condition occurring. That is, by monitoring the temperature situation of stator conductors 40 and applying torque limits to electric motor 16 based on torque vs. speed map 42 and de-rate factor vs. temperature map 44, protection system 26 can reduce or eliminate the possibility that electric motor 16 could experience sufficient torque/motor current levels to cause an overload condition.

Protection system 26 may also exhibit significantly shorter response times as compared to other systems. For example, incorporating a predictive component that sums the effects of present and past current levels with a measured temperature value, protection system 26 can quickly account for temperature changes in stator conductors 40. This predictive capacity of protection system 26 may significantly reduce the response times over systems that monitor conductor temperature based solely on the output of sensing devices.

It will be apparent to those skilled in the art that various modifications and variations can be made in the disclosed protection system without departing from the scope of the disclosure. Additionally, other embodiments of the disclosed system will be apparent to those skilled in the art from consideration of the specification. It is intended that the specification and examples be considered as exemplary only, with a true scope of the disclosure being indicated by the following claims and their equivalents.

What is claimed is:

1. A protection system for an electrical device, comprising:
    at least one temperature sensitive element located in a region adjacent to a component of the electrical device and configured to provide an output related to an actual temperature in the region; and
    a controller configured to:
        determine the actual temperature in the region based on the output of the at least one temperature sensitive element, and
        determine a predicted temperature of the component based on the actual temperature in the region, and on a sum of thermal power dissipation samples.

2. The protection system of claim 1, wherein the component includes a conductor of electricity, and the determination of the predicted temperature is further based on a magnitude of a current flowing in the conductor.

3. The protection system of claim 1, wherein the electrical component includes an electric motor.

4. The protection system of claim 3, wherein the controller is further configured to adjust at least one operational parameter associated with the electric motor upon determining that the predicted temperature of the component exceeds a predetermined value.

5. The protection system of claim 3, wherein the controller is further configured to apply a torque limit to the electric motor upon determining that the predicted temperature of the component exceeds a predetermined value.

6. The protection system of claim 3, wherein the controller is further configured to stop operation of the electric motor upon determining that the predicted temperature of the component exceeds a predetermined value.

7. The protection system of claim 1, wherein the at least one temperature sensitive element includes a platinum resistive temperature device.

8. The protection system of claim 1, wherein the at least one temperature sensitive element includes an array of temperature sensors disposed in various regions adjacent to the component.

9. The protection system of claim 1, wherein the component includes a conductor of electricity, and the controller is configured to determine the predicted temperature of the component by summing together the actual temperature and at least one term dependent on a magnitude of a current flowing in the conductor.

10. The protection system of claim 1, wherein the component includes a conductor of electricity, and the controller is configured to determine the predicted temperature of the component using the equation:

$$T_p(n) = T_a(n) + \alpha I^2(n-1) + \beta \sum_{x=0}^{n-2} \alpha I^2(x)$$

where $T_p$ represents the predicted temperature of the component, n represents a sample time, $T_a$ represents the actual temperature of the region, $\alpha$ represents a scale factor and a dissipation coefficient for the electrical device, I represents a magnitude of a current flowing in the conductor, and $\beta$ represents a dispersion constant.

11. The protection system of claim 1, wherein the component includes a stator conductor of an electric motor.

12. A method of protecting against an overload condition of an electric motor, comprising:
  determining an actual temperature of a region adjacent to a component of the electric motor;
  calculating a predicted temperature of the component based on the actual temperature and on a sum of thermal dissipation samples multiplied by a dispersion constant; and
  adjusting at least one operational parameter of the electric motor if the predicted temperature exceeds a predetermined value.

13. The method of claim 12, wherein the component includes a conductor of electricity, and calculating the predicted temperature is further based on a magnitude of a current flowing in the conductor.

14. The method of claim 12, wherein adjusting the at least one operational parameter of the electric motor includes applying a torque limit to the electric motor.

15. The method of claim 12, wherein adjusting the at least one operational parameter of the electric motor includes stopping operation of the electric motor.

16. The method of claim 12, wherein the component includes a conductor of electricity, and calculating the predicted temperature includes using the equation:

$$T_p(n) = T_a(n) + \alpha I^2(n-1) + \beta \sum_{x=0}^{n-2} \alpha I^2(x)$$

where $T_p$ represents the predicted temperature of the component, n represents a sample time, $T_a$ represents the actual temperature of the region, $\alpha$ represents a scale factor and a dissipation coefficient for the electric motor, I represents a magnitude of a current flowing in the conductor, and $\beta$ represents a dispersion constant.

17. A machine, comprising:
  a power source configured to provide a power output;
  a generator operatively coupled to the power source for converting at least a portion of the power output to electrical energy;
  at least one electric motor operatively coupled to the generator and configured to receive at least a portion of the electrical energy;
  at least one traction device operatively coupled to the at least one motor; and
  a protection system for the at least one electric motor, the protection system including:
    at least one temperature sensitive element located in a region adjacent to a component of the electric motor and configured to provide an output related to an actual temperature in the region; and
    a controller configured to:
      determine the actual temperature in the region based on the output of the at least one temperature sensitive element, and
      determine a predicted temperature of the component based on the temperature in the region, on a predetermined heat dissipation characteristic of the electric motor, and on a running sum of thermal dissiDation samDles.

18. The machine of claim 17, wherein the at least one temperature sensitive element includes a platinum resistive temperature device.

19. The machine of claim 17, wherein the component includes a conductor of electricity, and the controller is configured to determine the predicted temperature of the component by summing together the actual temperature and at least one term dependent on a magnitude of a current flowing in the conductor.

20. The machine of claim 17, wherein the component includes a conductor of electricity, and the controller is configured to determine the predicted temperature of the component using the equation:

$$T_p(n) = T_a(n) + \alpha I^2(n-1) + \beta \sum_{x=0}^{n-2} \alpha I^2(x)$$

where $T_p$ represents the predicted temperature of the component, n represents a sample time, $T_a$ represents the actual temperature of the region, $\alpha$ represents a scale factor and a dissipation coefficient for the electric motor, I represents a magnitude of a current flowing in the conductor, and $\beta$ represents a dispersion constant for the electric motor.

21. The machine of claim 17, wherein the controller is further configured to adjust at least one operational parameter associated with the electric motor upon determining that the predicted temperature of the component exceeds a predetermined value.

22. The machine of claim 17, wherein the controller is further configured to apply a torque limit to the electric motor upon determining that the predicted temperature of the component exceeds a predetermined value.

23. The protection system of claim 1, wherein the sum of thermal power dissipation samples is multiplied by a dispersion constant.

24. The protection system of claim 1, wherein the sum of thermal power dissipation samples is a running sum.

25. The method of claim 12, wherein the sum of thermal dissipation samples is a running sum.

26. The machine of claim 17, wherein the running sum of thermal dissipation samples is multiplied by a dispersion constant.

* * * * *